Nov. 27, 1962     A. W. STRINGER     3,065,649

AUTOMOTIVE ACCELERATOR PEDAL

Filed May 1, 1961

*INVENTOR.*
ARTIS W. STRINGER

BY William C. Babcock

ATTORNEY

3,065,649
AUTOMOTIVE ACCELERATOR PEDAL
Artis W. Stringer, 12006 Smallwood Ave., Downey, Calif.
Filed May 1, 1961, Ser. No. 106,758
5 Claims. (Cl. 74—560)

The present invention relates generally to the field of automotive accessories, and more particularly to a foot guide for use on an automotive accelerator pedal.

In modern automotive vehicles, the accelerator pedal is customarily of elongate structure, and the lower end thereof is pivotally supported from the floorboard of the vehicle, with the upper end thereof being connected either by a rod or series of linked rods, to the vehicle carburetor. Also, the pedal is usually disposed alongside a longitudinally extending "humped" or inclined portion of the floorboard of the vehicle.

The accelerator structure just described has several operational disadvantages. After a person has driven for a sustained period of time his foot becomes tired, and tends to assume an incorrect position on the accelerator pedal wherein such fatigue is further aggravated. Also when driving, not infrequently the foot slips from the accelerator pedal, usually toward the hump in the floorboard. When a person's foot inadvertently slips from the accelerator pedal in this manner, it is not only annoying and disconcerting, but if light shoes are being worn, they frequently become marked or soiled by contact with the exterior surface of the floorboard hump.

A major object of the present invention is to provide an automotive accelerator pedal accessory that is of extremely simple mechanical structure, can be easily attached to an accelerator pedal, is attractive in appearance, and will at all times serve to maintain a user's foot on an accelerator pedal in such a position as to minimize physical strain and fatigue.

A still further object of the invention is to provide a preferred form of the device that can be removably attached to an accelerator pedal with but a conventional screwdriver, and an alternate form of the invention, which when mounted on an accelerator pedal, forms a permanent part thereof.

These and other objects and advantages of the invention will become apparent from the following description thereof, and from the accompanying drawing illustrating the same in which.

Figure 1:
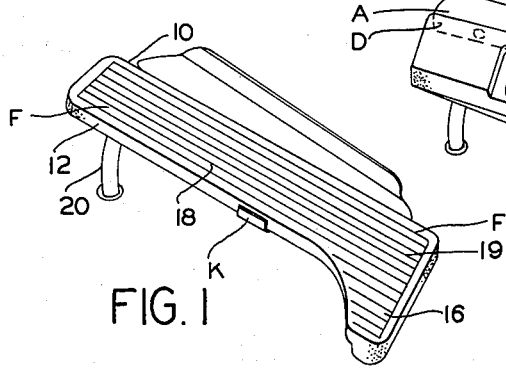
FIGURE 1 is a perspective view of the preferred form of the automotive accessory of the present invention shown removably mounted on an accelerator pedal of an automobile.
Figure 5:
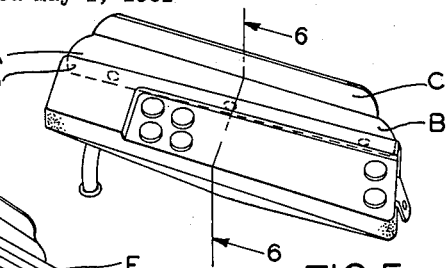
FIGURE 5 is a perspective view of an accelerator pedal showing the first alternate form of the invention mounted thereon.

Referring now to FIGURES 1 to 4 inclusive of the drawing for the structure of the preferred form of the invention, it will be seen to be fabricated from a sheet of rigid material A, such as steel, stainless steel, or the like, that is bent or otherwise formed to define an elongate central portion B. A first elongate flange C extends upwardly from the outer longitudinal edge of central portion B, and a second flange D projects downwardly from the inner edge thereof.

A second elongate portion E projects outwardly from the lower longitudinal edge of second flange D. Second portion E is adapted to extend under, and abut against the lower surface of accelerator pedal body F. A first lug G extends downwardly from the second portion E, as can best be seen in FIGURE 3. A clamping member H is also provided, and as shown, it too, is formed by bending or otherwise forming a sheet of rigid material into a generally Z shape. Clamping member H includes a web J that has an arm K extending upwardly from the outer edge thereof, and a second lug L that projects downwardly from the inner edge of the web. A screw M extends through an opening N formed in lug L.

Figure 3:
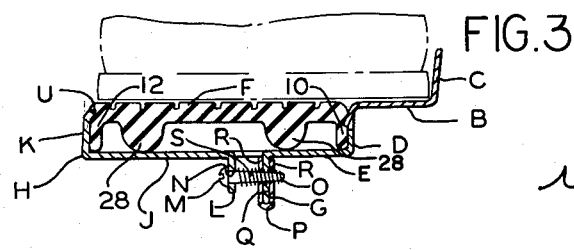
FIGURE 3 is a transverse cross-sectional view of the invention mounted on an accelerator pedal and taken on line 3—3 of FIGURE 2.

The screw M also extends through an opening O formed in first lug G. A member P of U-shaped cross section is provided, the two legs R of which extend upwardly on opposite sides of lug G. Legs R have aligned bores Q formed therein that can be brought into alignment with opening O. Bores Q are threadedly engaged by the threads S on screw M when the foot guide is mounted on an accelerator pedal F as shown in FIGURES 1 and 3.

When screw M is rotated in an appropriate direction, the first lug G and second lug L are drawn toward one another whereby the first flange C and arm K are brought into pressure contact with the longitudinally extending side surfaces 10 and 12 respectively of body F of the accelerator pedal. To prevent inadvertent displacement of the preferred form of the foot guide from pedal F, portions T are partially severed from second flange D and bent inwardly. When portions T are subjected to force, are pressed into the rubber or plastic defining accelerator pedal body F and prevent downward movement of the guide relative thereto. An inwardly extending lip U is formed on the upper portion of arm K. When the lip U is pressed into the pedal body F it cooperates with portions T to prevent downward movement of the guide relative thereto.

A conventional design for the accelerator pedal body F on many present-day automobiles is shown in FIGURE 1. In the main, the pedal body F is elongate in configuration, but the lower portion 16 thereof is wider than the upper portion 18 on which the side surfaces 10 and 12 are defined. The upper surface of body F has spaced longitudinally extending grooves 19 formed therein. The upper under surface of body F rests on a carburetor actuating member 20 forming no part of the invention. Member 20 is shown in phantom line in FIGURE 2.

Two cavities 22 extend upwardly in pedal portion 16 from the lower surface thereof. Cavities 22 serve to pivotally support the pedal body F on two balls 24 that are supported above the floorboard 26 of the vehicle by conventional means 27.

The under side of the pedal body F is recessed to define a number of ribs 28 that may extend either transversely, longitudinally, or both, depending on the make or brand of automobile on which the body F is used. However, ribs 28 in no way interfere with the use of the preferred form of the invention on the pedal body F. Some accelerator pedal bodies F are formed with downwardly extending portions (not shown). Such portions would interfere with mounting of the preferred form of the foot guide on the body F. To avoid this interference, an opening 30 is formed in the second elongate portion E at an appropriate location, with the downwardly extending portion (not shown) projecting through this opening.

Figure 6:
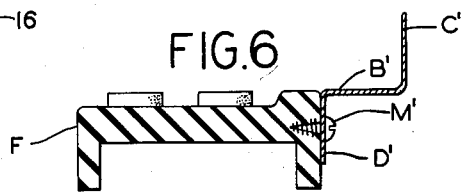
FIGURE 6 is a transverse cross-sectional view of the first alternate form of the accessory mounted on an accelerator pedal, and taken on line 6—6 of FIGURE 5.
Figure 2:
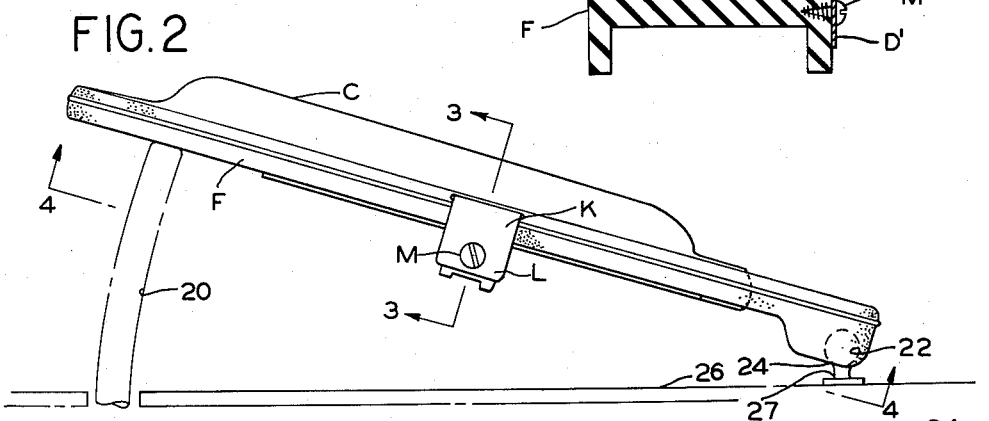
FIGURE 2 is a side elevational view of the accessory of the present invention mounted on an accelerator pedal.
Figure 4:
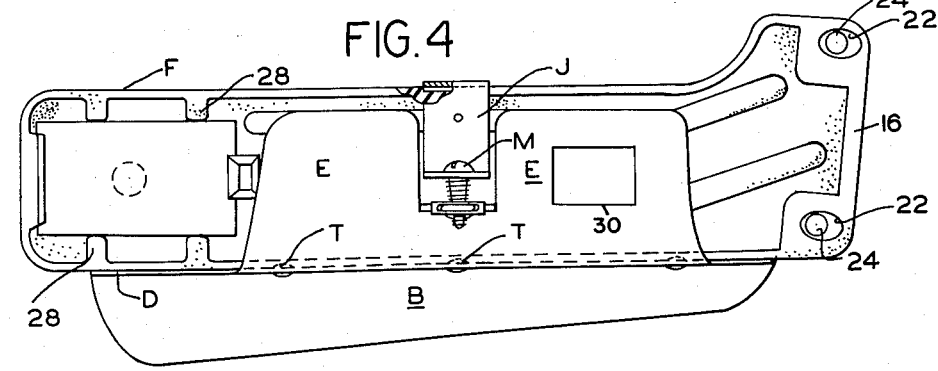
FIGURE 4 is a bottom plan view of an accelerator pedal showing the accessory removably mounted thereon.

A first alternate form of the invention is shown in FIGURE 6, that includes an elongate central portion B' and is provided with first and second flanges C' and D' respectively, projecting upwardly and downwardly from the longitudinal edges thereof. The central portion B' and flanges C' and D' are identical in shape and structure to the portion B and flanges C and D described in connection with the preferred form of the invention. A number of longitudinally spaced bores 32 are formed in flange D' through which screws M' extend to be threadedly embedded in the pedal body F. The first alternate form of the foot guide serves the same function as the preferred form thereof when mounted on an accelerator pedal body F. Should it be desired, the first alternate form of the invention could be integrally affixed to the pedal body F at the time it is molded or otherwise formed.

The operation of the preferred and first alternate forms of the invention will be obvious from the description hereinabove, and accordingly need not be repeated.

Although the invention herein shown and described is fully capable of achieving the objects and providing the advantages hereinbefore mentioned, it is to be understood to be merely illustrative of a preferred and first alternative embodiments thereof, and that I do not mean to be limited to the details of construction described herein other than as defined in the appended claims.

I claim:

1. A foot guide attachment for removably mounting on an accelerator pedal of the type including an elongate resilient body that is pivotally supported at one end above the floorboard of a vehicle and connected on the opposite end to a carburetor actuating rod, said body having first and second longitudinally extending sides, which attachment comprises: a single sheet of rigid material that defines an elongate central portion, a first flange which extends upwardly from the outer edge of said central portion, and a second flange that extends downwardly from the inner edge of said central portion, said second flange being capable of abutting against a first edge portion of said pedal, with the upper surface of said central portion lying in substantially the same place as the upper surface of said pedal; and means for holding said second flange rigidly on said first edge portion so that said first flange limits the lateral movement of a driver's foot in a direction away from said pedal toward said first flange.

2. An accessory capable of being removably attached to an accelerator pedal of an automotive vehicle of the type that includes an elongate resilient body having first and second longitudinally extending side surfaces, which body is pivotally supported at one end above the floorboard of said vehicle and connected at the opposite end thereof to a carburetor actuating rod, said accessory serving to limit the lateral movement of a driver's foot in one direction relative to said body and comprising: a sheet of rigid material so formed to define an elongate first portion, a first flange that extends upwardly from an outer longitudinal edge of said elongate portion, a second flange extending downwardly from an inner longitudinal edge of said first elongate portion and adapted to abut against a first side portion of said pedal, a second elongate portion projecting outwardly from the lower edge of said second flange in a direction away from said first flange, said second portion being capable of abutting against a lower surface of said pedal, and a lug that extends downwardly from said second elongate portion; a clamp member including an elongate web, an arm projecting upwardly from a first end of said web, and a second lug extending downwardly from a second end of said web, said second lug being adapted to be disposed adjacent said first lug when said arm is in abutting contact with the second side portion of the pedal; and means for drawing said first and second lugs toward one another to bring said second flange and arm into frictional pressure contact with said first and second side portions to removably hold said accessory on said pedal.

3. An accessory as defined in claim 2 wherein said first elongate portion has an outer edge that tapers outwardly from the inner edge thereof.

4. An accessory as defined in claim 2 wherein said means is a screw that extends through a bore formed in said second lug to threadedly engage said first lug.

5. An accessory as defined in claim 2 wherein portions of said second flange and arm extend inwardly and are forced into said resilient body when said first and second lugs are drawn toward one another.

References Cited in the file of this patent

UNITED STATES PATENTS

| | | |
|---|---|---|
| 1,276,114 | Reynolds | Aug. 20, 1918 |
| 1,277,207 | Fischer | Aug. 27, 1918 |
| 1,826,906 | Townsend | Oct. 13, 1931 |
| 2,451,700 | Van Trine | Oct. 19, 1948 |
| 2,679,767 | Wasserkrug | June 1, 1954 |

FOREIGN PATENTS

| | | |
|---|---|---|
| 936,544 | France | Feb. 23, 1948 |